(12) United States Patent
Fraczak et al.

(10) Patent No.: US 9,074,140 B2
(45) Date of Patent: Jul. 7, 2015

(54) APPARATUS FOR THERMOLYSIS WASTE PLASTICS AND METHOD FOR THERMOLYSIS WASTE PLASTICS

(75) Inventors: Daria Fraczak, Jaworzno (PL); Bartlomiej Samardakiewicz, Pruszków (PL)

(73) Assignee: Clariter IP S.A., Grand-Duché Du (LU)

( * ) Notice: Subject to any disclaimer, the term of this patent is extended or adjusted under 35 U.S.C. 154(b) by 879 days.

(21) Appl. No.: 13/263,242

(22) PCT Filed: Jul. 2, 2009

(86) PCT No.: PCT/IB2009/052879
§ 371 (c)(1),
(2), (4) Date: Dec. 9, 2011

(87) PCT Pub. No.: WO2010/116211
PCT Pub. Date: Oct. 14, 2010

(65) Prior Publication Data
US 2012/0097518 A1 Apr. 26, 2012

(30) Foreign Application Priority Data
Apr. 8, 2009 (PL) .......................... 387742

(51) Int. Cl.
*C07C 1/00* (2006.01)
*C10G 1/10* (2006.01)
(Continued)

(52) U.S. Cl.
CPC . *C10G 1/10* (2013.01); *C10B 49/14* (2013.01); *C10B 53/07* (2013.01); *C10G 2300/1003* (2013.01)

(58) Field of Classification Search
CPC C10B 49/14; C10B 53/07; C10G 2300/1003; C10G 1/10

USPC ............ 585/241; 201/6, 25; 202/93, 96, 108, 202/111; 110/246, 347
See application file for complete search history.

(56) References Cited

U.S. PATENT DOCUMENTS

| 4,944,867 A | 7/1990 | Mundstock et al. |
| 4,954,371 A * | 9/1990 | Yializis ..................... 427/497 |

(Continued)

FOREIGN PATENT DOCUMENTS

| EP | 0872535 A1 | 10/1998 |
| PL | 196880 B1 | 2/2008 |

(Continued)

OTHER PUBLICATIONS

Angyal, Andras et al., "Petrochemical feedstock by thermal cracking of plastic waste", Journal of Analytical and Applied Pyrolysis, May 2007, pp. 409-414, vol. 79, Issues 1-2, University of Pannonia, Veszprem, Hungary.

(Continued)

*Primary Examiner* — Nina Bhat
(74) *Attorney, Agent, or Firm* — Fleit Gibbons Gutman Bongini & Bianco PL; Martin Fleit; Paul D. Bianco

(57) ABSTRACT

The apparatus for thermolysis of waste plastics has a feeding system, a thermolysis reactor, an external circulation loop, and a product collecting system. The collecting and two-step product separation system includes a condenser, a product cooling system, a light fraction receiver with a gaseous product removing system, a crude heavy fraction receiver, and a vacuum evaporator. In the plastic waste thermolysis method, product vapors are removed continuously from the reactor and conducted to the condenser for condensation of vapors to yield a product mixture, which is separated into light oil and crude heavy oil. The light oil is conducted to the light oil receiver and a light oil tank for further processing. The crude heavy oil is pumped to a vacuum evaporator through a heat exchanger for separating into wax and heavy oil for further processing.

21 Claims, 1 Drawing Sheet

(51) Int. Cl.
*C10B 49/14* (2006.01)
*C10B 53/07* (2006.01)

(56) References Cited

U.S. PATENT DOCUMENTS

| | | | |
|---|---|---|---|
| 5,286,374 A * | 2/1994 | Chen | 208/400 |
| 5,738,025 A | 4/1998 | Tachibana | |
| 5,811,606 A | 9/1998 | Yang | |
| 6,150,577 A | 11/2000 | Miller et al. | |
| 6,822,126 B2 | 11/2004 | Miller | |
| 7,423,189 B2 * | 9/2008 | Chen | 585/241 |
| 7,758,729 B1 | 7/2010 | DeWhitt | |
| 8,188,325 B2 | 5/2012 | DeWhitt | |
| 8,317,980 B2 * | 11/2012 | Li et al. | 201/2 |
| 8,674,154 B2 * | 3/2014 | Podeszfa et al. | 585/241 |
| 2003/0050519 A1 | 3/2003 | Cheng | |
| 2003/0199718 A1 | 10/2003 | Miller | |

FOREIGN PATENT DOCUMENTS

| | | |
|---|---|---|
| PL | 381533 A1 | 7/2008 |
| PL | 383709 A1 | 5/2009 |
| PL | 205461 B1 | 4/2010 |
| PL | 386410 A1 | 5/2010 |

OTHER PUBLICATIONS

International Search Report published Oct. 14, 2010 for PCT/IB2009/052879.
International Preliminary Report on Patentability published Oct. 11, 2011 for PCT/IB2009/052879.
Written Opinion published Oct. 8, 2011 for PCT/IB2009/052879.

* cited by examiner

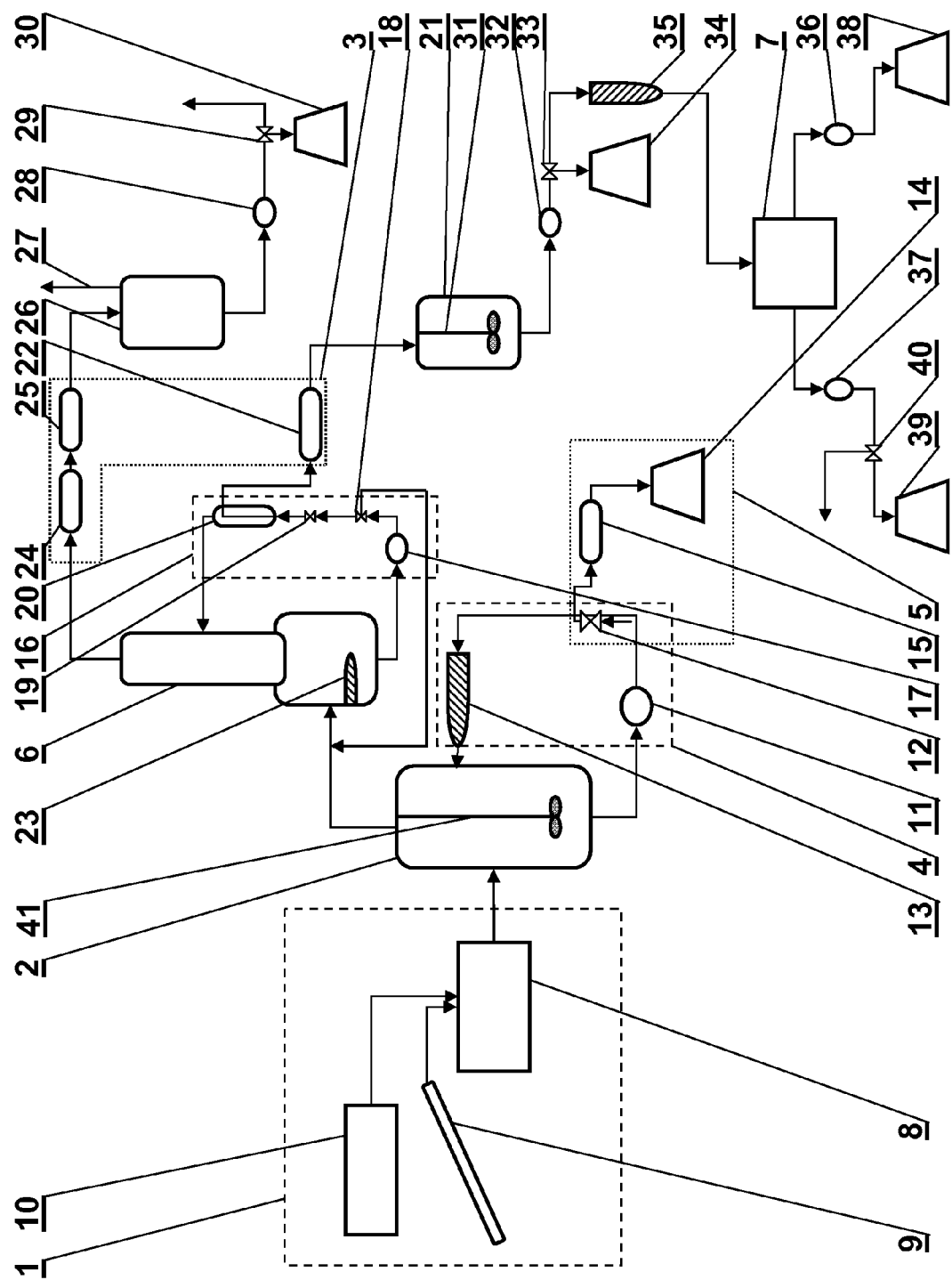

APPARATUS FOR THERMOLYSIS WASTE PLASTICS AND METHOD FOR THERMOLYSIS WASTE PLASTICS

FIELD OF THE INVENTION

This invention provides an apparatus for thermolysis of the plastic waste and a method for thermolysis of the waste plastics especially to get hydrocarbon products.

BACKGROUND OF THE INVENTION

From patent PL 196880 it is known method for getting hydrocarbon oils consisted on putting into intake hopper of extruder or other feeding device the milled plastic with cracking catalyst which are transported to bottom part of reactor in which in temperature 380-500° C. polymeric chains' cracking and producing light hydrocarbons takes place. Those light hydrocarbons are passing to air cooler from which vapor-liquid mixture is transported to separator from which the liquid phase is returned into cracking reactor and gaseous phase is conducted to water-cooled condenser followed by cracking gas tank. The liquid phase is separated on gasoline fraction conducted into tank and diesel oil conducted into tank in distillation column. Direction of conducting of cracked plastic and heating fumes is countercurrent. Waste plastic cracking reactor is characterized in that in top of reactor is tube heat exchanger connected with gas or fuel oil burners and liquid plastic level measuring device is installed over heat exchanger. In the bottom of reactor under heat exchanger wall the revision hutch is situated.

From U.S. Pat. No. 4,944,867 there is known a process for obtaining oil, gas and other products from waste plastics based on depolymerization of waste in a retort with a stream of retort gases. Hot gases are injected at an intermediate point of the retort and a stream of cold gaseous are injected at the bottom of the retort. The depolymerization gases are removed and directed to a cyclone for separation of heavy liquid components from a gaseous stream. The gaseous stream is then purified and compressed with a portion of the compressed stream being heated and reinjected as the stream of hot gases into retort. The other portion of the compressed stream of gases is cooled and a liquid component consisting primarily of water and heavy oil is separated therefrom in a spray tower. The water portion is separated from the oil and recirculated to the spray tower while part of the oily portion is separated for reuse outside the process with remainder being recycled to the cyclone. A portion of the compressed gases from the cyclone is cooled and injected into the bottom of the retort as the stream of cold gases.

From patent application P-383709 description, applied for protection on 7 Nov. 2007, it is known the apparatus and method for depolymerization of waste plastics, especially polyolefins, with removing reaction leftovers and residues. Apparatus consisted of feeding conveyor, pyrolysis reactor and discharging section is characterized by gas engaging stabilizer equipped with mixer and working in close loop at least one external pyrolysis reactor with screw or ribbon mixer and pipe that closes the loop. Depolymerization process is carried out with inert gas presence and characterized by reactor enforced dual flow in which one of mixing directions is used as well to discharge the reaction residue.

From patent application No P-381533, applied for protection on 15 Jan. 2007, involving method of separation polyolefinic waste plastics destructive treatment products there is known two-step vapor condensation. In the first step of separation product vapors are partly condensed in the column using cooled fraction, favorably medium fraction, fed in such a portion that vapor temperature after first step of condensation is about 250-300° C. and at the same time condensed heavy fraction is collected. In the second step of condensation product vapors are cooled in cooler to 110-130° C. and cooled mixture is rectified in the column and vapors from top of the column are condensed in cooler and separated on gaseous phase, water phase and liquid hydrocarbon phase in separator. That liquid hydrocarbon phase is partly returned to the column as a reflux and partly collected as a light fraction. Steam is injected to the rectification column in amount 10% in proportion to amount of processed destruction products. Residue is received from the bottom of column and is partly returned to the column as a reflux and partly collected as a medium phase after cooling.

From patent application No P-386410, applied for protection on 31 Oct. 2008, it is known apparatus for thermolysis of waste plastics, especially polyolefins, and method of thermolysis with continuous feeding and continuous discharging carbonizable substances and reaction leftovers. Apparatus includes plastic feeding system, pyrolysis reactor, discharging system according to the invention is characterized in that after the plastic feeding system the extruder and pyrolysis reactor which height is at least 1.5 time bigger than its diameter are situated. Pyrolysis reactor is equipped with dual high speed propeller. Method for thermolysis of plastic waste especially polyolefins with presence of inert gas according to the claim is characterized that plastic waste are continuously fed to the extruder where are plasticized from 180° C. up to the temperature of the reactor later, and are fed to the pyrolysis reactor where at 350-450° C. at agitator's 30-1500 rpm the thermolysis is carried out with continuous two step fractional condensation where light product boiling below 180° C. goes to storage tank with cold jacket and heavy product boiling above 180° C. is conducted to hot jacket tank.

SUMMARY OF THE INVENTION

Principal aim of the invention is an apparatus and method for thermolysis of plastic waste, especially polyolefins, carried out continuously with continuous conducting removing of products and residue streams in which condensation is carried out to get three separated hydrocarbon fractions.

Apparatus for thermolysis of waste plastics consisting feeding system, thermolysis reactor, external circulation loop and product collecting system according to the invention is characterized in that collecting and two-step product separation system is involving condenser, product cooling system, light fraction receiver with gaseous product removing system, crude heavy fraction receiver and vacuum evaporator. Favorably light product cooling system has two steps and consists two serial connected heat exchangers and crude heavy product cooler system has at least one heat exchanger.

Favorably heat exchangers in light product cooling system are cooled by oil and water and heat exchanger in crude heavy product cooling system is cooled by oil.

Favorably condenser is a direct contact condenser.

Favorably condenser is connected to the condensate circulation system.

Favorably cooling medium in direct contact condenser is cooled product condensate.

Favorably condenser has built-in start-up heater.

Favorably start-up heater is a electrical heater.

Favorably condensate circulation system consists of circulation pump, at least two three-way valves and heat exchanger.

Favorably circulation pump is a vortex pump.

Favorably circulation pump is cooled by oil.

Favorably product stream is pressed by pump from light oil receiver to light oil tank.

Favorably crude heavy oil receiver is connected by pipeline through heat exchanger with condenser condensate circulation system.

Favorable crude heavy oil receiver has heated walls and stirrer.

Favorably product is pressed by pump from crude heavy oil receiver through three-way valve where it is divided on stream conducted to crude heavy oil tank and stream conducted to vacuum evaporator.

Favorably crude heavy oil heater is situated before vacuum evaporator and following three-way valve.

Favorably crude heavy oil heater is heated by oil.

Favorably vacuum evaporator is a wiped film evaporator.

Favorably the wiped film evaporator is heated and cooled by oil.

Favorably vacuum evaporator and transfer pump are followed by wax tank and second transfer pump is followed by heavy oil tank.

Favorably three-way valve is followed by heavy oil tank.

Plastic waste thermolysis method in inert gas atmosphere in which wastes are continuously fed to extruder and plasticized and then depolymerized in thermolysis reactor according to the invention is characterized in that product vapors are removed continuously from reactor and conducted to condenser in which condensation of vapors is carried out and product mixture separation to light oil involving hydrocarbon fractions with chain length up to C15, conducted to light oil receiver from which the gaseous products are received and liquid products are conducted to light oil tank and for further processing and crude heavy oil involving hydrocarbon fractions with chain length more than C15, which through heat exchanger and crude heavy oil receiver is pumped to vacuum evaporator in which next step of separation of crude heavy oil to wax involving hydrocarbon fractions with chain length more than C24 and heavy oil involving hydrocarbon fractions with chain length in range C15-C24, which are collected in wax tank and heavy oil tank and conducted for further processing takes place, is obtained.

Favorably powder additives in form of metals' salts or oxides are added to waste plastics.

Favorably additives are salts or oxides of metals of 1, 2, 6, 12 or 13 group of periodic table.

Favorably as a salts are used $Na_2CO_3$ or $CaCO_3$ or $MgCO_3$ or any mixture of them.

Favorably as a oxides are used ZnO or CaO or MgO or FeO or $Fe_2O_3$ or $Al_2O_3$ or any mixture of them.

Favorably thermolysis process is carried out in 390 to 430° C.

Favorably wastes are plasticized in extruder in 250 to 370° C.

Favorably part of heavy oil stream is returned to condenser feeding stream and part is returned to the condenser through heat exchanger as a cooling medium and rest of the heavy oil is conducted through heat exchanger to crude heavy oil receiver.

Main advantage of the invention is designing relatively small size process equipment for continuous conversing waste plastics into products with high repeatability of properties which can be directly sold or be processed thereafter. Process can be carried out without catalyst or using additives for process stabilizing depending on assumed target parameters and capacity of individual products. Such a flexibility of the process gives possibility of accommodation of the process for requirements for properties of light oil, heavy oil and wax as well as requirements coming out from changeability of feedstock stream which is waste by design.

Using extruder as a feedstock feeder made possible reduction temperature difference between feedstock and reaction mixture for level ensuring stability of system work, reducing its energy consumption and reducing amount of produced unwanted by-products such as coke. External circulation loop reduced contact time of reaction mixture with main heating point, which is electrical heater by forcing liquid moving. That gave streamlining of heating with simultaneous significant reduction of coke amount.

Two-step product separation process causes separation on three products with high level repeatability of properties. Crude heavy oil circulation in condenser improves capacity of separation. Using wiped film evaporator gives effective separation of heavy oil and wax without additional secondary degradation of products which cannot be avoided in distillation for example.

Products obtained from the process in form of light oil, heavy oil and wax can be direct commercial products or be intermediate products ready for further processing, for example in hydrorefining for getting high-purity products. Gaseous product obtained from light oil receiver can be used as a fuel gas and after burning be a source of heat for heating hot oil used in process.

BRIEF DESCRIPTION OF THE DRAWING

The object of the invention is reconstructed in example on the FIGURE—scheme of the system for thermolysis of polyolefins.

DETAILED DESCRIPTION OF THE INVENTION

Example of implementation caused below do not limit possibilities of use of the invention.

I System Implementation

Apparatus for thermolysis according to the invention consists of granulate or leaf-shaped plastic feeding system 1 from which the feedstock is fed to extruder 8. Initial plasticized in extruder 8 and heated up to 300-330° C. granulate is conducted to reactor 2 in which thermolysis process is carried out. Reactor 2 has dual high-speed propeller 41. Plasticized polymer thermolysis process is carried out in temperature 390-430° C. with agitators 200-700 rpm. Plasticized polymer is conducted by circulation pump 11 and forced to external recirculation loop 4 through three-way valve 12 and flux heater 13. Residue receiving is obtained in receiving system 5 through three-way valve 12 and through residue cooling heat exchanger 15 to the tank 14. Product vapors are continuously removed from reactor 2 to condenser 6 in which vapor condensation and product mixture separation on light oil involving hydrocarbon fraction with chain length up to C15, conducted to light oil receiver 26 from which gaseous products are received and liquid products are conducted to light oil tank 30 and further processing and on crude heavy oil involving hydrocarbon fractions with chain length more than C15, are obtained. Receive and two-step product separation system consists the condenser 6, separation products cooling system 3, light fraction receiver 26 with gaseous products removing system 27, crude heavy fraction receiver 21 and vacuum evaporator 7. Light products cooling system has two steps and consists two connected in series heat exchanger 24 and 25. Crude heavy products cooling system has one oil-cooled heat exchanger 22. Heat exchanger 24 is cooled by oil and heat exchanger 25 is cooled by water. Condenser 6 is a direct contact condenser and has inside electrical start-up heater 23.

Cooling medium in direct contact condenser 6 is a cooled condensate of product. Condenser 6 is connected with condensate circulation system 16 which consists of oil-cooled vortex circulation pump 17, two three-way valves 18 and 19 and heat exchanger 20. Product stream is pumped from light oil receiver 26 by pump 28 through three-way valve 29 to light oil tank 30. Crude heavy oil involving hydrocarbon fractions with chain length more than C15 is pumped through heat exchanger 22 and crude heavy oil receiver 21 to crude heavy oil tank 34 or vacuum evaporator 7 in which next separation of crude heavy oil to wax involving hydrocarbon fractions with chain length more than C24 and heavy oil involving hydrocarbon fractions with chain length in range C15-C24 is obtained. Crude heavy oil receiver 21 is connected with condenser condensate circulation system 16 by pipeline through heat exchanger 22. Crude heavy oil receiver 21 has heated walls and stirrer 31. Product is pumped by pump 32 from crude heavy oil receiver 21 through three-way valve 33 where is divided on stream conducted to crude oil receiver tank 34 and stream conducted to vacuum evaporator 7. Before vacuum evaporator and following a three-way valve 33 is hot oil heated crude heavy oil heater 35. Vacuum evaporator 7 is oil cooled and oil heated wiped film evaporator. Vacuum evaporator 7 is followed by transfer pump 36 followed by wax tank 38 and transfer pump 37 followed by three-way valve 40 and heavy oil tank 39.

II System Implementation

Apparatus for thermolysis according to the invention consists of granulate or leaf-shaped plastic feeding system 1 from which the feedstock is fed to extruder 8. Prior to extruder there is a feedstock belt feeder 9 and powder additives screw feeder 10. $Na_2CO_3$, $CaCO_3$, $MgCO_3$ or any mixture of them are used as a additives. Initial plasticized in extruder 8 and heated up to 300-330° C. granulate is conducted to reactor 2 in which thermolysis process is carried out. Reactor 2 has dual high-speed propeller 41. Plasticized polymer thermolysis process is carried out in temperature 390-430° C. with agitators 200-700 rpm. Plasticized polymer is conducted by circulation pump 11 and forced to external recirculation loop 4 through three-way valve 12 and flux heater 13. Residue receiving is obtained through three-way valve 12 and through residue cooling heat exchanger 15 to the tank 14. Product vapors are continuously removed from reactor 2 to condenser 6 in which vapor condensation and product mixture separation on light oil involving hydrocarbon fraction with chain length up to C15, conducted to light oil receiver 26 from which gaseous products are received and liquid products are conducted to light oil tank 30 and further processing and on crude heavy oil involving hydrocarbon fractions with chain length more than C15, are obtained. Receive and two-step product separation system consists the condenser 6, separation products cooling system 3, light fraction receiver 26 with gaseous products removing system 27, crude heavy fraction receiver 21 and vacuum evaporator 7. Light products cooling system has two steps and consists two connected in series heat exchanger 24 and 25. Crude heavy products cooling system has one oil-cooled heat exchanger 22. Heat exchanger 24 is cooled by oil and heat exchanger 25 is cooled by water. Condenser 6 is a direct contact condenser and has inside electrical start-up heater 23.

Cooling medium in direct contact condenser 6 is a cooled condensate of product. Condenser 6 is connected with condensate circulation system 16 which consists of oil-cooled vortex circulation pump 17, two three-way valves 18 and 19 and heat exchanger 20. Product stream is pumped from light oil receiver 26 by pump 28 through three-way valve 29 to light oil tank 30. Crude heavy oil involving hydrocarbon fractions with chain length more than C15 is pumped through heat exchanger 22 and crude heavy oil receiver 21 to crude heavy oil tank 34 or vacuum evaporator 7 in which next separation of crude heavy oil to wax involving hydrocarbon fractions with chain length more than C24 and heavy oil involving hydrocarbon fractions with chain length in range C15-C24 is obtained. Crude heavy oil receiver 21 is connected with condenser condensate circulation system 16 by pipeline through heat exchanger 22. Crude heavy oil receiver 21 has heated walls and stirrer 31. Product is pumped by pump 32 from crude heavy oil receiver 21 through three-way valve 33 where is divided on stream conducted to crude oil receiver tank 34 and stream conducted to vacuum evaporator 7. Before vacuum evaporator and following a three-way valve 33 is hot oil heated crude heavy oil heater 35. Vacuum evaporator 7 is oil cooled and oil heated wiped film evaporator. Vacuum evaporator 7 is followed by transfer pump 36 followed by wax tank 38 and transfer pump 37 followed by three-way valve 40 and heavy oil tank 39. Part of heavy oil is returned to the condenser feeding stream and part is returned to the condenser 6 through heat exchanger 20 as a cooling medium to the condenser 6 and residue is conducted through heat exchanger to the crude heavy oil receiver 21.

The invention claimed is:

1. Apparatus for thermolysis of waste plastics consisting a feeding system, a thermolysis reactor, an external circulation loop and product vapors collecting and two-step separation system, wherein the product vapors collecting and two-step separation system comprises: a condenser (6) for condensing the product vapors and separating the condensate into light oil fraction and crude heavy oil fraction, a cooling system (3), a light oil fraction receiver (26) with a gaseous product removing system (27), a crude heavy oil fraction receiver (21) and a vacuum evaporator (7) following the crude heavy oil fraction receiver for separating the crude heavy oil into heavy oil fraction and wax.

2. The apparatus according to claim 1 wherein the cooling system (3) comprises a light oil cooling system having two parts and consists of two serial connected heat exchangers (24) and (25) and the crude heavy oil cooling system having at least one heat exchanger (22).

3. The apparatus according to claim 2 wherein the heat exchangers (24 and 22) are cooled by oil, the heat exchanger (25) is cooled by water.

4. The apparatus according to claim 1 wherein the condenser (6) is a direct contact condenser and optionally connected to a condensate circulation system (16).

5. The apparatus according to claim 1 wherein the cooling medium in the direct contact condenser (6) is cooled condensate.

6. The apparatus according to claim 1 wherein the condenser (6) has a built-in start-up heater (23).

7. The apparatus according to claim 6 wherein the start-up heater (23) is an electrical heater.

8. The apparatus according to claim 4 wherein the condensate circulation system (16) consists of a circulation pump (17), at least two three-way valves (18), (19) and a heat exchanger (20).

9. The apparatus according to claim 1 wherein circulation pump (17) is a vortex pump or cooled by oil.

10. The apparatus according to claim 1 wherein product stream is pressed by a pump (28) from the light oil fraction receiver (26) to a light oil tank (30).

11. The apparatus according to claim 4 wherein the crude heavy oil fraction receiver (21) is connected by a pipeline through the heat exchanger (22) with the condensate circulation system (16).

12. The apparatus according to claim 1 wherein the crude heavy oil fraction receiver (21) has heated walls and a stirrer (31).

13. The apparatus according to claim 1 comprising a pump (32) in communication with the crude heavy oil fraction receiver (21) through a three-way valve (33) to a crude heavy oil tank (34) and the vacuum evaporator (7) adapted to press the product from the crude heavy oil fraction receiver (21) through the three-way valve (33) where it is divided to a stream conducted to the crude heavy oil tank (34) and a stream conducted to the vacuum evaporator (7).

14. The apparatus according to claim 13 wherein a crude heavy oil heater (35) is situated before the vacuum evaporator (7) and following a three-way valve.

15. The apparatus according to claim 1 wherein vacuum evaporator (7) is a wiped film evaporator and is optionally heated and cooled by oil.

16. The apparatus according to claim 1 wherein the vacuum evaporator (7) and a transfer pump (36) are followed by a wax tank (38) and a second transfer pump (37) is followed by a heavy oil tank (39).

17. A method of plastic waste thermolysis in inert gas atmosphere said method comprising:
continuously feeding wastes to an extruder;
plasticizing and depolymerizing the wastes in a thermolysis reactor, wherein at least a part of the plasticized and depolymerized waste is circulated through an external circulation loop;
continuously removing product vapors from the thermolysis reactor and conducting the vapors to a condenser in which the vapors are condensed by a condenser to yield a product mixture;
separating the product mixture into light oil comprising hydrocarbon fractions with chain length up to C15 and crude heavy oil comprising hydrocarbon fractions with chain length more than C15;
conducting the light oil to a light oil receiver from which gaseous products are separated and liquid products are conducted to a light oil tank for further processing;
pumping the crude heavy oil to a vacuum evaporator through a heat exchanger for separating the crude heavy oil into wax comprising hydrocarbon fractions with chain length of more than C24 and heavy oil comprising hydrocarbon fractions with chain length in range C15-C24;
collecting the wax and heavy oil in a wax tank and heavy oil tank, respectively; and
conducting the wax and heavy oil for further processing.

18. The method according to claim 17 wherein powder additives in the form of metal salts or oxides are added to the waste plastics.

19. The method according to claim 17 characterized by at least one of the following:
the thermolysis process is carried out at 390 to 430 degrees centigrade;
the wastes are plasticized in the extruder at 250 to 370 degrees centigrade; and
part of the crude heavy oil stream is returned to the condenser feeding stream, another part of the crude heavy oil stream is returned to the condenser through heat exchanger as a cooling medium and the rest of the crude heavy oil stream is conducted through the heat exchanger to the crude heavy oil receiver.

20. The method of claim 18, wherein metal of the metal salts or metal oxides is selected from the group consisting of 1, 2, 6, 12 and 13 group of the periodic table.

21. The method of claim 18, wherein the metal salt or metal oxide is selected from the group consisting of $Na_2CO_3$, $CaCO_3$, $MgCO_3$, $ZnO$, $CaO$, $MgO$, $FeO$, $Fe_2O_3$, $Al_2O_3$ and any mixture thereof.

* * * * *